United States Patent
Guo et al.

(10) Patent No.: US 10,573,247 B2
(45) Date of Patent: Feb. 25, 2020

(54) PIXEL ARRAY, DISPLAY DRIVING DEVICE HAVING SUB-PIXEL GROUPS OFFSETTING IN COLUMN AND DRIVING METHOD THEREOF, AND DISPLAY DEVICE

(71) Applicants: BOE Technology Group Co., Ltd., Beijing (CN); Beijing BOE Optoelectronics Technology Co., Ltd., Beijing (CN)

(72) Inventors: Renwei Guo, Beijing (CN); Xue Dong, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 93 days.

(21) Appl. No.: 15/308,534

(22) PCT Filed: Dec. 30, 2015

(86) PCT No.: PCT/CN2015/099874
§ 371 (c)(1),
(2) Date: Nov. 2, 2016

(87) PCT Pub. No.: WO2017/036040
PCT Pub. Date: Mar. 9, 2017

(65) Prior Publication Data
US 2017/0270870 A1    Sep. 21, 2017

(30) Foreign Application Priority Data
Aug. 28, 2015    (CN) .......................... 2015 1 0543531

(51) Int. Cl.
*G09G 3/36*       (2006.01)
*G09G 3/3275*   (2016.01)
(Continued)

(52) U.S. Cl.
CPC ........... *G09G 3/3275* (2013.01); *G09G 3/003* (2013.01); *G09G 3/2003* (2013.01);
(Continued)

(58) Field of Classification Search
CPC ......... G09G 2300/0439–0495; G09G 3/2983–2986; G09G 3/3607; G09G 3/364; G09G 3/3659
See application file for complete search history.

(56) References Cited

U.S. PATENT DOCUMENTS

2004/0080479 A1    4/2004   Credelle
2004/0246404 A1    12/2004  Elliott et al.
(Continued)

FOREIGN PATENT DOCUMENTS

CN    104506843 A    4/2015
CN    104639928 A    5/2015
(Continued)

OTHER PUBLICATIONS

May 16, 2017—(CN) First Office Action Appn 201510543531.X with English Tran.
(Continued)

*Primary Examiner* — Sanghyuk Park
(74) *Attorney, Agent, or Firm* — Banner & Witcoff, Ltd.

(57) ABSTRACT

A pixel array, a display driving device and a driving method thereof, and a display device are provided. The pixel array includes multiple columns of sub-pixel groups, each column of sub-pixel groups includes M×N sub-pixels arranged along a column direction, wherein the sub-pixel groups in odd numbered columns and the sub-pixel groups in even numbered columns offset in the column direction by ½ of a width of each sub-pixel in the column direction; each sub-pixel in each column of sub-pixel groups distorts in the column direction, and a distortion direction of the sub-pixel groups (Continued)

in the odd numbered columns is opposite to that of the sub-pixel groups in the even numbered columns. The crosstalk between the two views during 3D image displaying is improved by distortion of sub-pixels. A rendering method of the sub-pixels and 3D display are combined through the algorithm design, and the virtual resolution for each view is increased by algorithm compilation of 3D input signals, so as to make the display effect of 3D better.

12 Claims, 6 Drawing Sheets

(51) Int. Cl.
    *G09G 3/00* (2006.01)
    *G09G 3/20* (2006.01)
    *H04N 13/305* (2018.01)
    *H04N 13/32* (2018.01)
    *H04N 13/324* (2018.01)

(52) U.S. Cl.
    CPC ......... *G09G 3/2074* (2013.01); *H04N 13/305* (2018.05); *H04N 13/32* (2018.05); *H04N 13/324* (2018.05); *G09G 2300/0452* (2013.01); *G09G 2310/0294* (2013.01); *G09G 2320/028* (2013.01); *G09G 2320/0209* (2013.01); *G09G 2340/0457* (2013.01); *G09G 2360/16* (2013.01)

(56) References Cited

U.S. PATENT DOCUMENTS

| | | | |
|---|---|---|---|
| 2005/0088385 A1 | 4/2005 | Elliott et al. | |
| 2005/0225548 A1 | 10/2005 | Han et al. | |
| 2005/0225562 A1 | 10/2005 | Higgins et al. | |
| 2007/0258031 A1* | 11/2007 | Choi | G02F 1/133707 349/129 |
| 2008/0218461 A1* | 9/2008 | Sugita | G02F 1/133621 345/88 |
| 2011/0025669 A1 | 2/2011 | Kwak et al. | |
| 2011/0149225 A1 | 6/2011 | Hung | |
| 2012/0104939 A1 | 5/2012 | Park et al. | |
| 2012/0268481 A1* | 10/2012 | Niioka | H04N 13/317 345/619 |
| 2014/0300626 A1 | 10/2014 | Gu | |
| 2015/0035872 A1* | 2/2015 | Shima | H04N 13/0404 345/690 |

FOREIGN PATENT DOCUMENTS

| | | |
|---|---|---|
| CN | 104641279 A | 5/2015 |
| CN | 104680949 A | 6/2015 |
| CN | 104681001 A | 6/2015 |
| CN | 104766548 A | 7/2015 |
| CN | 105185288 A | 12/2015 |
| KR | 1020070094507 A | 9/2007 |
| KR | 1020120018831 A | 3/2012 |
| KR | 1020130001446 A | 1/2013 |
| KR | 101540641 B1 | 7/2015 |

OTHER PUBLICATIONS

Nov. 24, 2017—(CN) Second Office Action Appn 201510543531.X with English Tran.
May 25, 2016—(WO) International Search Report and Written Opinion Appn PCT/CN2015/099874 with English Tran.
Sep. 28, 2018—(KR) Notice of Allowance Appn 10-2017-7000701.

\* cited by examiner

Fig. 11

PIXEL ARRAY, DISPLAY DRIVING DEVICE HAVING SUB-PIXEL GROUPS OFFSETTING IN COLUMN AND DRIVING METHOD THEREOF, AND DISPLAY DEVICE

The application is a U.S. National Phase Entry of International Application No. PCT/CN2015/099874 filed on Dec. 30, 2015, designating the United States of America and claiming priority to Chinese Patent Application No. 201510543531.X, filed Aug. 28, 2015. The present application claims priority to and the benefit of the above-identified applications and the above-identified applications are incorporated by reference herein in their entirety.

TECHNICAL FIELD

Embodiments of the present invention relate to a pixel array, a display driving device and a driving method thereof, and a display device.

BACKGROUND

Naked-eye 3D is a three-dimensional display technology, which distinguishing the information into the left and right eyes of people through the grating to make people feel the effect of 3D, and it is widely used in TVs with a large size. But in the process of observation, the image resolution of the naked-eye 3D is reduced a lot due to the light blocking design of the grating, and sometimes reduced the PPI (number of pixels per inch) by half, so that the watching effect of 3D is reduced.

Virtual display technology is widely used in the current field of display, which makes the visual resolution higher than the physical resolution of the display panel through the pixel sharing. Currently, Samsung is a panel producer that using the most virtual technology. In the production of sub-pixels in OLED, the bottleneck is generated in the production of higher PPI display due to the difficulty of the technology of forming organic resin patterns. Virtual technology can solve this problem very well, and improve the screen resolution felt by human eyes.

SUMMARY

An embodiment of the invention provides a pixel array, comprising multiple columns of sub-pixel groups, each column of sub-pixel groups comprises M×N sub-pixels arranged along a column direction, and M is a number of colors of the sub-pixels and N is a positive integer greater than 2, wherein, the sub-pixel groups in odd numbered columns and the sub-pixel groups in even numbered columns offset in the column direction by a determined distance; each sub-pixel in each column of sub-pixel groups distorts in the column direction, and a distortion direction of the sub-pixel groups in the odd numbered columns is opposite to that of the sub-pixel groups in the even numbered columns.

In some examples, the determined distance is ½ of a width of each sub-pixel in the column direction.

In some examples, each of the sub-pixels has a shape of parallelogram.

In some examples, the parallelogram comprises two first sides along the column direction and two second sides adjacent to the two first sides, the second sides of the parallelogram in adjacent columns intersect with each other and have a same angle relative to the column direction.

In some examples, an inner acute angle of the parallelogram is between 0 and 20 degrees.

In some examples, the inner acute angle of the parallelogram is between 5 and 8 degrees.

In some examples, each pixel unit comprises sub-pixels of a setting number in each column of the sub-pixel groups and the setting number is 1, 3/2 or 2.

In some examples, the M has a value of 3 and the pixel array is a triangular array.

In some examples, three sub-pixels adjacent to each other in two adjacent columns are sub-pixels with three different colors, respectively.

In some examples, a width of each of the sub-pixels in the column direction is ½ of that in a row direction.

Another embodiment of the invention provides a display driving device, configured to drive 3D display device, the 3D display device comprising the pixel array according to any one of claims 1 to 10, the display device comprising: a first pixel division unit configured to divide an image to be displayed into a plurality of pixel units, and determine color components of each color in each pixel unit; a first luminance determination unit configured to, for each sub-pixel, determine a luminance of the sub-pixel according to the color components of the color of the sub-pixel in each pixel unit covered by a sampling area corresponding to the sub-pixel.

In some examples, the sampling area is a rectangular area, and four end points of the rectangular area are: points each of which is on center lines in the column direction of two columns adjacent to the column where the sub-pixel is located and has a distance of 3/2 sub-pixel heights from a line passing the center of the sub-pixel along the row direction.

Another embodiment of the invention provides a display driving method, used to drive 3D display device, the 3D display device comprising: the pixel array according to any one of claims 1 to 10, the sub-pixels in the odd numbered columns are first view sub-pixel groups and sub-pixels in the even numbered columns are second view sub-pixel groups; the display driving method comprising: dividing the first and the second views to be displayed into a plurality of pixel units, and determining color components of each color in each pixel unit; for each sub-pixel of each view, determining a luminance of the sub-pixel according to the color components of the color of the sub-pixel in each pixel unit belong to the view and covered by the sampling area corresponding to the sub-pixel.

In some examples, the sampling area is a rectangular area, and four end points of the rectangular area are: points each of which is on center lines in the column direction of two columns adjacent to the column where the sub-pixel is located and has a distance of 3/2 sub-pixel heights from a line passing the center of the sub-pixel along the row direction.

Another embodiment of the invention provides a display device including the above mentioned pixel array and/or the above mentioned display driving device.

BRIEF DESCRIPTION OF THE DRAWINGS

In order to clearly illustrate the technical solution of the embodiments of the invention, the drawings of the embodiments will be briefly described in the following; it is obvious that the drawings in the description are only related to some embodiments of the invention and thus are not limitative of the invention.

DETAILED DESCRIPTION

In order to make objects, technical details and advantages of the embodiments of the invention, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

In order to improve the effect of the naked-eye 3D of the display device, embodiments of the invention provide a pixel array, a display driving device and a driving method thereof and a display device. In the technical details of embodiments of the invention, the effect of the naked-eye 3D is improved by improving the shape of each sub-pixel and the 3D signal input modes.

Figure 2:
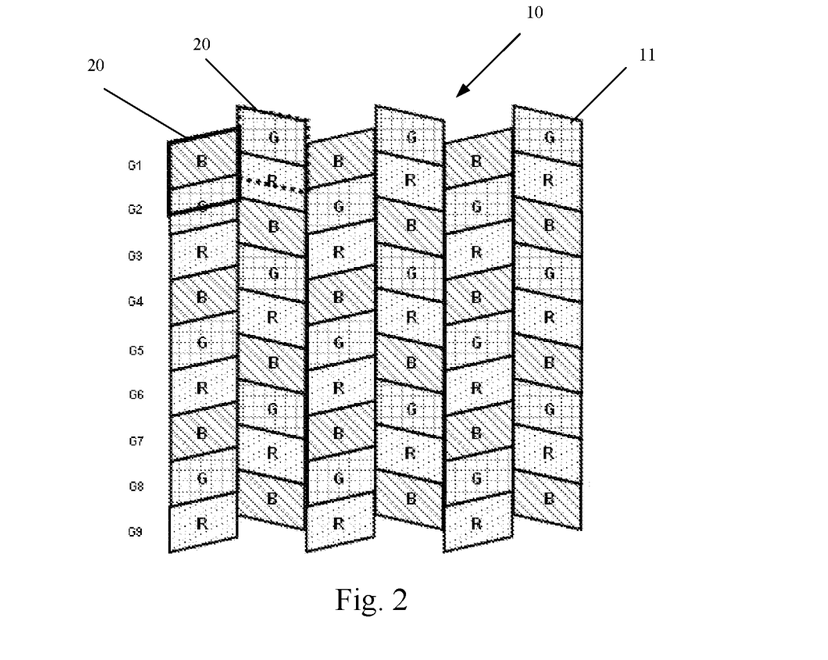
FIG. 2 is a schematic view of a pixel array.

FIG. 2 is a structural schematic view of a pixel array provided by an embodiment of the invention. The embodiment of the invention provides a pixel array 10 including multiple columns of sub-pixels. Each column of sub-pixels comprises M×N sub-pixels 11, and M is a number of species of the colors of the sub-pixels 11 and N is a positive integer greater than 2.

In the pixel array 10, sub-pixels in odd numbered columns and even numbered columns offset along the column direction by ½ of the width of the sub-pixels 11 in the column direction.

Each sub-pixel 11 in each column of sub-pixels distorts in the column direction, and the direction of distortion in sub-pixels in odd numbered columns is opposite to that in the even numbered columns. The distortion refers to that the shape of the sub-pixels is of a parallelogram relative to a shape of rectangular for a normal sub-pixel. The distortion in the column direction refers to two sides along the column direction staggering by a distance to each other in the column direction.

A pixel unit 20 includes sub-pixels 11 of a setting number in each column of sub-pixels.

In the above mentioned embodiment, the distorted sub pixel 11 is adopted to improve the crosstalk between the two views when the 3D image is displayed, and the effect of the naked-eye 3D display is improved.

As illustrated in FIG. 2, the sub-pixel 11 is in the shape of the parallelogram. The direction of distortion in the sub-pixels 11 of the sub-pixels in odd numbered column is opposite to that in the even numbered columns as to the distortion in the column direction. Take the first column and the second column as examples, the distortion of the sub-pixels 11 of the sub-pixels in the first column is left low and right high, and the distortion of the sub-pixels 11 of the sub-pixels in the second column is left high and right low, and the left and right of the distortion are directions based on the direction of the pixel array 10 as illustrated in FIG. 2. Inner acute angles of the parallelogram are between 0 to 20 degrees in the specific distortion. The inner acute angles are 5 degrees, 10 degrees, 15 degrees, 20 degrees of any degrees between 0-20 degrees are provided in the embodiment. In some examples, the inner acute angles of the parallelogram are between 5 to 8 degrees, such as 5 degrees, 6 degrees, 7 degrees, 8 degrees of any degrees between 5-8 degrees.

In some examples, as illustrated in FIG. 2, the parallelogram includes two first sides along the column direction and two second sides adjacent to the two first sides, the second sides in the adjacent columns of the parallelogram intersect with each other and with the same angle relative to the column direction.

In some examples, as illustrated in FIG. 2, three sub-pixels adjacent to each other in two adjacent columns are sub-pixels with three different colors, respectively.

Figure 1:
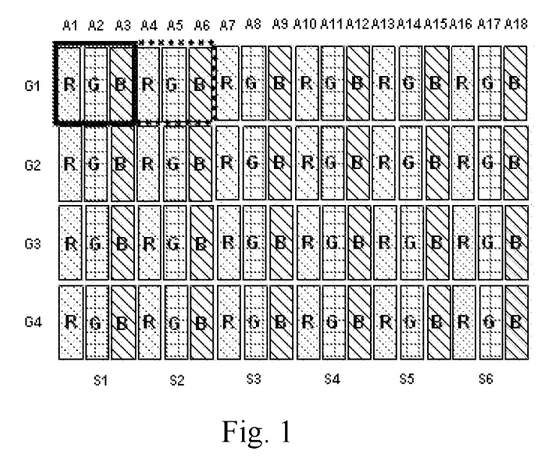
FIG. 1 is a schematic view of pixel units of a pixel array provided by the embodiment of the invention.

FIG. 1 and FIG. 2 illustrate the relationship between the pixel arrangement of real stripe and the design of pixels in the embodiment of the invention. FIG. 1 illustrates a theory pixel unit framed by a thick black line frame and a dashed frame respectively. Each theory pixel unit includes three rectangular sub-pixels, and each sub-pixel has a length three times its width. For example, the sub-pixels include RGB sub-pixels. FIG. 2 is the pixel array 10 corresponding to embodiment of the invention. The thick black frame and the dashed frame in FIG. 2 are the design basis of the pixel units 20 which have the same area as the theory pixel units. The shape of the pixel units 20 is of a parallelogram in FIG. 2, the length of the bottom edge of the parallelogram is the same as that of the theory pixel unit framed by the thick black line frame and the dashed frame in FIG. 1, and the height of the parallelogram is the same as the width of the theory pixel unit.

In the embodiment, each the pixel units 20 includes the sub-pixels 11 of a setting number, and the setting number is 1, 3⁄2 or 2. That is, each pixel unit comprises one sub-pixel 11, 3⁄2 sub-pixels 11 or two sub-pixels 11. The 3⁄2 sub-pixels 11 and the two sub-pixels 11 are sub-pixels 11 located in the same column.

In addition, the sub-pixels 11 provided by the embodiment comprise the sub-pixels 11 with three different colors, that is, the value of M is 3. The sub-pixels 11 with three colors are, for example, red sub-pixels, blue sub-pixels and green sub-pixels. Exemplary arrangement is illustrated in FIG. 2. At the same time, the pixel array 10 provided by the embodiment is a triangular array. For example, the triangular array is a triangle composed of connection lines of the centers in the adjacent sub-pixels 11 with three different colors, and the above mentioned adjacent sub-pixels 11 with three different colors are the three adjacent sub-pixels 11 not in the same column.

The sub-pixels in different columns are arranged staggeredly in the pixel array 10 provided by the embodiment of the invention. For example, the dislocation of the sub-pixels in odd and even numbered columns in the column direction is ½ of the width of the sub-pixels 11 in the column direction. In addition, the width of the sub-pixels 11 in the column direction is ½ of that in the row direction.

In addition, the embodiment of the invention further provides a display driving device. The display driving device is configured to drive 3D display device, the 3D display device comprises any one of the above mentioned pixel array. The display driving device comprises: a first pixel division unit configured to divide the image to be displayed into a plurality of theory pixel units, and determine the color component of each color in each pixel unit; a first luminance determination unit configured to, for each sub-pixel, determine the luminance of the sub-pixel according to the color components of the color of the sub-pixel in each pixel unit covered by the sampling area corresponding to the sub-pixel.

In the above mentioned method, for each sub-pixel, the overlapping areas between the sampling area corresponding to the sub-pixel and each pixel unit in the plurality of pixel units, and the color components corresponding to the color of the sub-pixel in the pixel units are determined; products of the overlapping areas corresponding to each pixel unit and the corresponding color components are determined; and the luminance of the sub-pixel is determined according to a sum of the products, and the area of the sampling area.

In some examples, the sampling area is a rectangular area, and four end points of the rectangular area are: points each of which has a distance of 3⁄2 sub-pixel heights from the center of the sub-pixel along a vertical direction, and each of which is in a line along the column direction in two columns adjacent to a column where the sub-pixel is located, respectively.

In addition, the embodiment of the invention further provides a display driving method, the display device is a 3D display device, and the 3D display device comprises: any one of the above mentioned pixel array. The sub-pixels in the odd numbered columns are first view sub-pixel groups and the sub-pixels in the even numbered columns are second view sub-pixel groups. The display driving method comprises: dividing the first and the second views to be displayed into a plurality of pixel units, and determining the color components of each color in each pixel unit; for each sub-pixel of each view, determining the luminance of the sub-pixel according to the color components of the color of the sub-pixel in each pixel unit belong to the view and covered by the sampling area corresponding to the sub-pixel.

In order to facilitate the understanding of the embodiment of the invention, a detailed description is provided in conjunction with the drawings.

Step 1: dividing a first view and a second view to be displayed into a plurality of pixel units, and determining color components of each color in each unit pixel unit.

For example, the pixel array 10 is divided into different pixel units 20. As illustrated in FIG. 2, each of the pixel units 20 comprises sub-pixels 11 of a setting number when dividing the pixel array 10, and the setting number is 1, 3⁄2 or 2. That is, each of the pixel units comprises one sub-pixel 11, 3⁄2 sub-pixels 11 or two sub-pixels 11. The 3⁄2 sub-pixels 11 and the two sub-pixels 11 are sub-pixels 11 located in the same column. Each pixel unit 20 comprises the sub-pixel 11 located in the same column of the pixel groups in the specific division. As illustrated in FIG. 2, each pixel unit 20 comprises the 3⁄2 sub-pixel 11, and the 3⁄2 sub-pixel 11 located in the same column of the sub-pixels.

Step 2: for each sub-pixel of each view, determining the luminance of the sub-pixel according to the color components of the color of the sub-pixel in each pixel unit belong to the view and covered by the sampling area corresponding to the sub-pixel.

Figure 3:
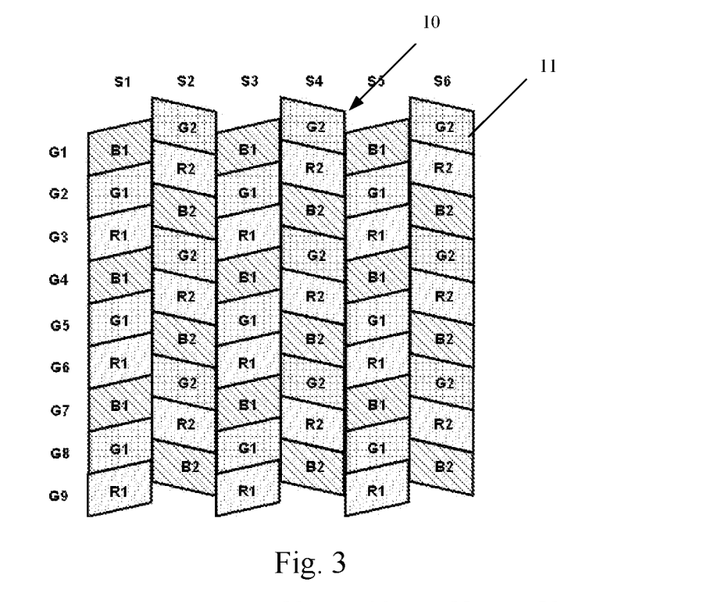
FIG. 3 is a schematic view illustrating arrangement of sub-pixel groups corresponding to a view 1 and a view 2 in a pixel array provided by an embodiment of the invention.

For example, control signals of 3D views comprise signals of two views, the two views are the view 1 and the view 2, respectively, and the effect of 3D formed when the view 1 is introduced into left eye of human and the view 2 is introduced into right eye of human. The different columns in the pixel array 10 corresponding to the view 1 and the view 2, respectively. For example, sub-pixels in the odd columns correspond to the signals in the view 1, and the sub-pixels in the even columns correspond to the signals in the view 2. As illustrated in FIG. 3, the sub-pixels 11 in the sub-pixels corresponding to the view 1 are R1, G1, B1, and the sub-pixels 11 in the sub-pixels corresponding to the view 2 are R2, G2, B2. As illustrated in FIG. 3, the sub-pixels corresponding to the view 1 and the view 2 are arranged alternately. That is, the sub-pixel columns of the view 1 and the sub-pixel columns of the view 2 are arranged alternately.

The pixel units 20 in the embodiment take each pixel unit 20 including 3⁄2 sub-pixels 11 as an example as illustrated in FIG. 2. At the same time, in order to describe the sampling area 30 corresponding to the sub-pixels 11 provided by the embodiment conveniently, the sub-pixels 11 of each color are described respectively, and take the sub-pixels corresponding to the view 1 as an example.

Figure 4:
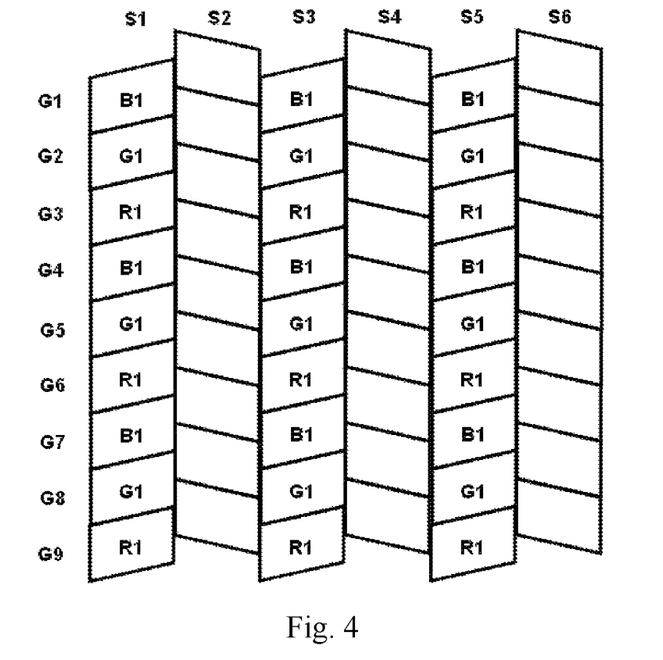
FIG. 4 is a schematic view illustrating arrangement of sub-pixel groups corresponding to a view 1 provided by an embodiment of the invention.

First, please refer to FIG. 3 and FIG. 4. FIG. 3 illustrates the view signal relationship corresponding to the pixel array 10; FIG. 4 illustrates the arrangement of the sub-pixels 11 corresponding to the view 1; the sub-pixels corresponding to the view 1 provided by the embodiment are sub-pixels in the odd columns, that is, sub-pixels in the columns of S1, S3, S5 are sub-pixels 11 corresponding to the view 1, and FIG. 4 illustrates the array of the sub-pixels.

For the sampling area 30 of the color sub-pixels 11, the sampling area is a rectangular area, and four end points of the rectangular respectively are: points each of which has a distance of 3⁄2 sub-pixel heights from the center of the sub-pixel along a vertical direction, and each of which is in a line along the column direction in two columns adjacent to a column where the sub-pixel is located, respectively. That is, the points each of which is on center lines in the column direction of two columns adjacent to the column where the sub-pixel is located and has a distance of 3⁄2 sub-pixel heights from a line passing the center of the sub-pixel along the row direction.

Figure 5:
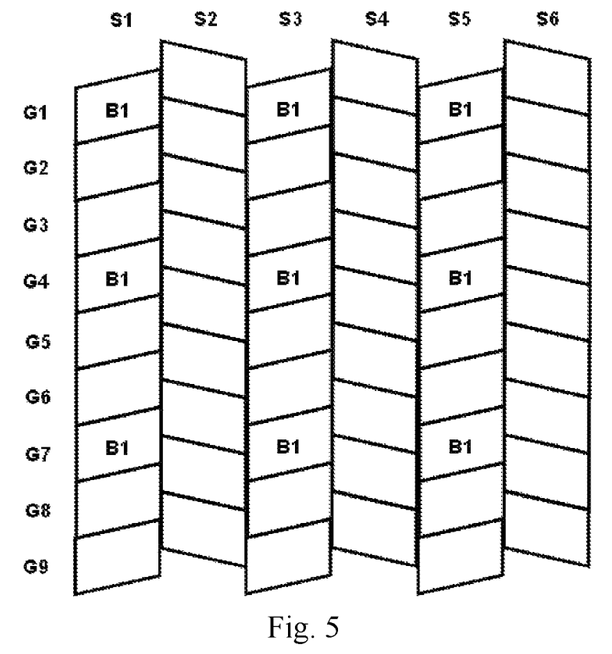
FIG. 5 is a schematic view illustrating arrangement of blue sub-pixels corresponding to a view 1 provided by an embodiment of the invention.
Figure 6:
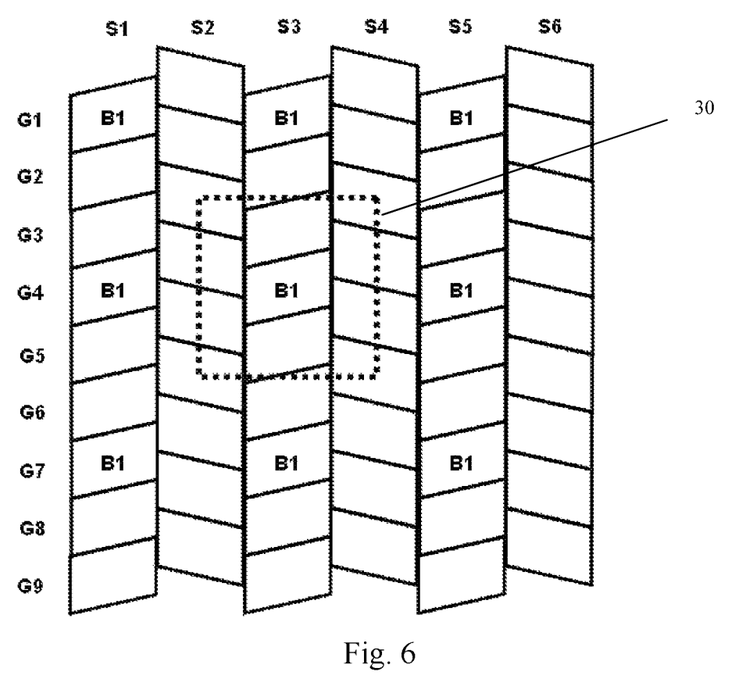
FIG. 6 is a schematic view of a sampling area corresponding to blue sub-pixels corresponding to a view 1 provided by an embodiment of the invention.
Figure 7:
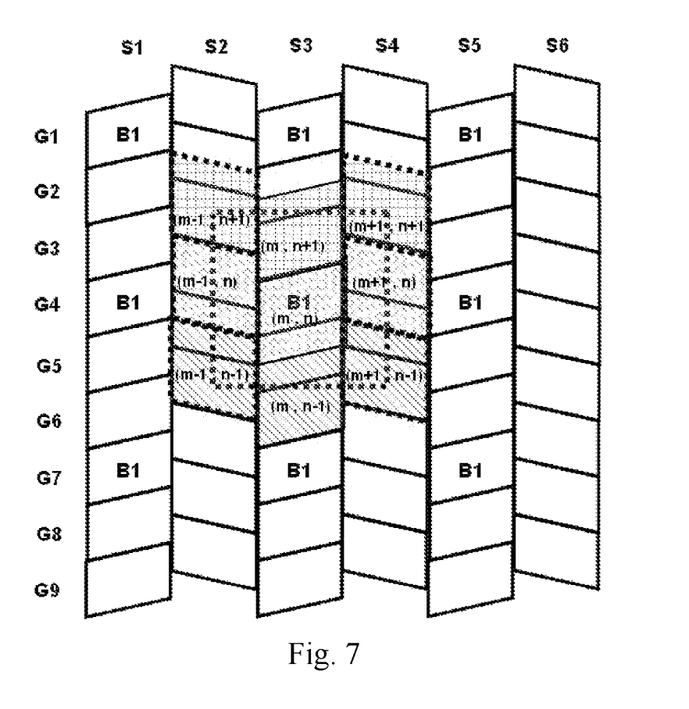
FIG. 7 is a schematic view of pixel units covered by a sampling area corresponding to blue sub-pixels corresponding to a view 1 provided by an embodiment of the invention.

As illustrated in FIGS. 5-7, FIG. 5 illustrates the arrangement of blue sub-pixels corresponding to the view 1; FIG. 6 illustrates a design schematic view of the sampling area 30 of the blue sub-pixels corresponding to the view 1; FIG. 7 illustrates the pixel units covered by the sampling area 30 corresponding to the blue sub-pixels corresponding to the view 1. As illustrated in FIG. 6, the sampling area 30 corresponding to the blue sub-pixel take the sub-pixel 11 of the color as a center, and the sampling area 30 are a rectangular with a size of the width of three sub-pixels in the column direction and the width of two sub-pixels in the row direction. As illustrated in FIG. 6, the sub-pixels 11 in the pixel array 10 provided by the embodiment are torque structures, that is, the shape of the sub-pixels 11 is a parallelogram, therefore, when the sampling area 30 is a rectangle, parts of the rectangular sampling area 30 comprise a part of two sub-pixels 11 located in the same column as the blue sub-pixel and located above the blue sub-pixel, a part of two sub-pixels 11 located in the same column as the blue sub-pixel and located below the blue sub-pixel, and cover a part of three sub-pixels 11 of sub-pixels in each column of the two columns adjacent to the blue sub-pixel. Please refer to FIG. 7, FIG. 7 illustrates the pixel unit covered by the sampling area 30 corresponding to the blue sub-pixel as illustrated in FIG. 6. As illustrated in FIG. 7, the coordinate of the pixel unit corresponding to the blue sub-pixel is (m, n), at this time, the pixel units covered by the sampling area respectively are (m−1, n−1), (m−1, n), (m−1, n+1), (m, n−1), (m, n), (m, n+1), (m+1, n−1), (m+1, n) and (m+1, n+1), a total of nine unit pixel units.

Figure 8:
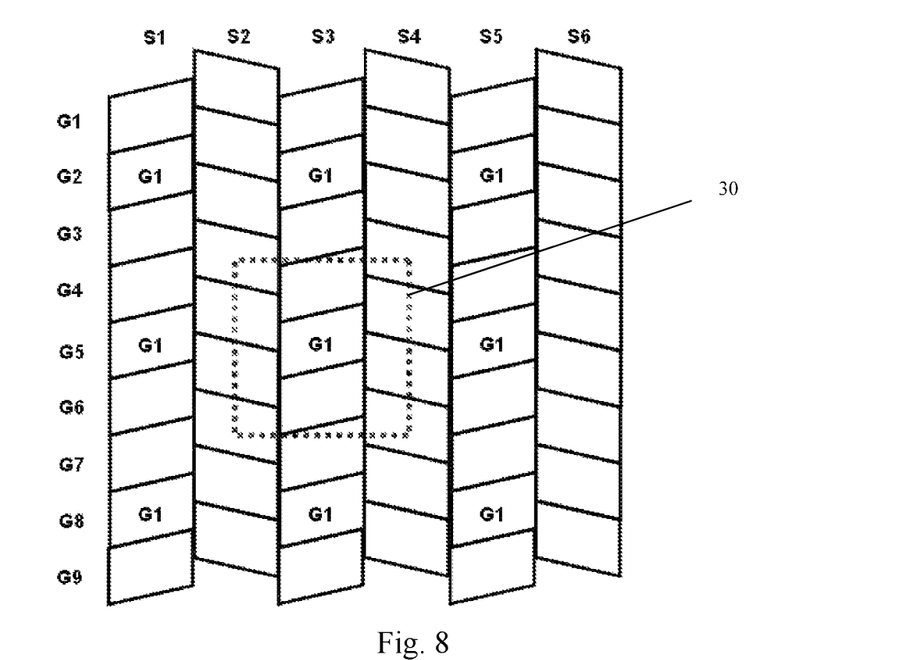
FIG. 8 is a schematic view of a sampling area corresponding to green sub-pixels corresponding to a view 1 provided by an embodiment of the invention.
Figure 9:
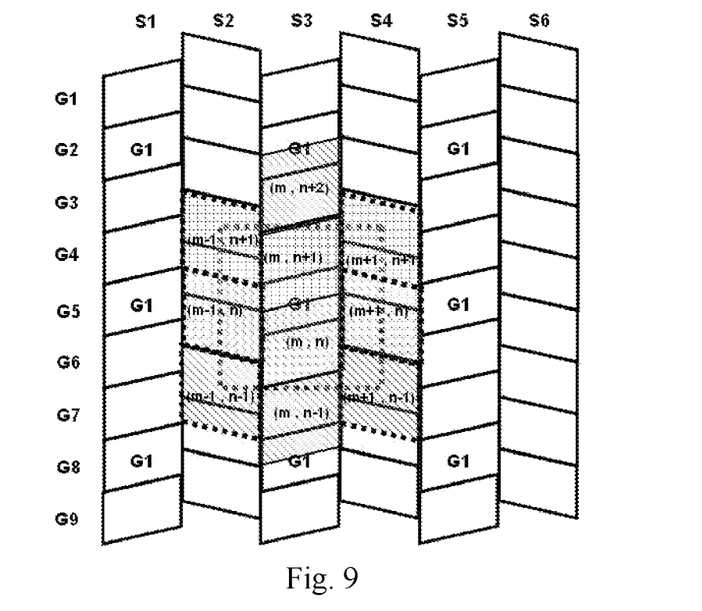
FIG. 9 is a schematic view of pixel units covered by a sampling area corresponding to green sub-pixels corresponding to a view 1 provided by an embodiment of the invention.

For green sub-pixels, please refer to FIG. 8 and FIG. 9. FIG. 8 illustrates the arrangement of green sub-pixels corresponding to the view 1 and the sampling area 30 corresponding to the green sub-pixels; FIG. 9 illustrates the pixel units covered by the sampling area 30 corresponding to the green sub-pixels. First, please refer to FIG. 8, the sampling area 30 corresponding to the green sub-pixels provided by the embodiment is a rectangle, parts of the rectangular sampling area 30 comprise a part of two sub-pixels 11 located in the same column as the green sub-pixel and located above the green sub-pixel, a part of two sub-pixels 11 located in the same column as the green sub-pixel and located below the green sub-pixel, and cover a part of three sub-pixels 11 of sub-pixels in each column of the two columns adjacent to the green sub-pixel. FIG. 9 illustrates the pixel unit covered by the sampling area 30 corresponding to the green sub-pixel as illustrated in FIG. 8. As illustrated in FIG. 9, the coordinate of the unit pixel unit corresponding to the green sub-pixel is (m, n), at this time, pixel units covered by the sampling area are (m−1, n−1), (m−1, n), (m−1, n+1), (m, n−1), (m, n), (m, n+1), (m, n+2), (m+1, n−1), (m+1, n) and (m+1, n+1), respectively, a total of ten unit pixel units.

Figure 10:
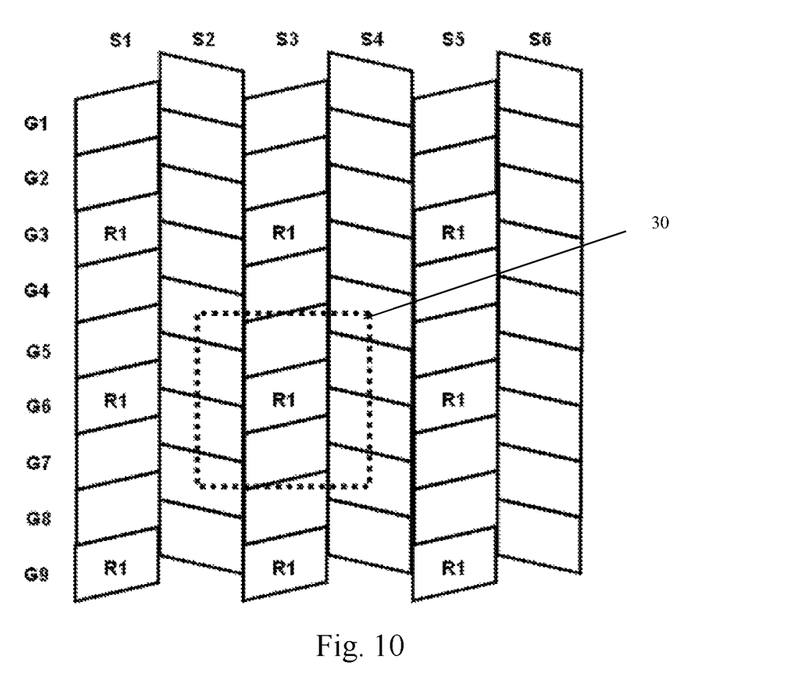
FIG. 10 is a schematic view of a sampling area corresponding to red sub-pixels corresponding to the view 1 provided by an embodiment of the invention.
Figure 11:
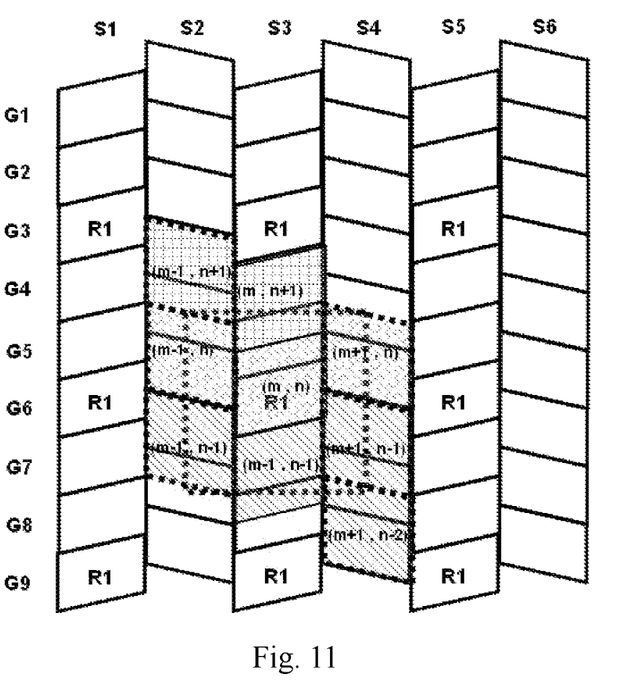
FIG. 11 is a schematic view of pixel units covered by a sampling area corresponding to red sub-pixels corresponding to a view 1 provided by an embodiment of the invention.

For red sub-pixels, as illustrated in FIG. 10 and FIG. 11, and FIG. 10 illustrates the structure of the sampling area 30 corresponding to the red sub-pixels; FIG. 11 illustrates the pixel units covered by the sampling area 30 corresponding to the red sub-pixels. First, please refer to FIG. 10, the sampling area 30 corresponding to the red sub-pixels provided by the embodiment is a rectangle, parts of the rectangular sampling area 30 comprise a part of two sub-pixels 11 located in the same column as the red sub-pixel and located above the red sub-pixel, a part of two sub-pixels 11 located in the same column as the red sub-pixel and located below the red sub-pixel, and cover a part of three sub-pixels 11 of sub-pixels in each column of the two columns adjacent to the red sub-pixel. FIG. 11 illustrates the pixel unit covered by the sampling area 30 corresponding to the red sub-pixel as illustrated in FIG. 10. As illustrated by FIG. 11, the coordinate of the pixel unit corresponding to the red sub-pixel is (m, n), at this time, pixel units covered by the sampling area are (m−1, n−1), (m−1, n), (m−1, n+1), (m, n−1), (m, n), (m, n+1), (m+1, n−2), (m+1, n−1) and (m+1, n), respectively, a total of nine unit pixel units.

In addition, the design mode of the sampling area 30 in the sub-pixels corresponding to the view 2 is the same as the design mode of the sub-pixels 11 corresponding to the view 1, which is not repeated herein.

It can be seen from the above description, signals in the view 1 and the view 2 of two views in the algorithm design are split, and the signals are split for each view, respectively, that is, for the split of RGB signals. The sampling area 30 is designed based on each color. Because each sub-pixel 11 has a certain actual output position, the sampling area 30 can be determined, and the correspondence of the corresponding input signals can be determined according to the sampling area 30.

Advantages of the control method provided by the embodiment of the invention comprises: combining a rendering method of the sub-pixels 11 and 3D display through the algorithm design, increasing the virtual resolution in each view by algorithm compilation of 3D input signals, so as to make the display effect of 3D better.

Another embodiment of the invention provides a display device including any one of the above mentioned pixel array and/or any one of the above mentioned display driving device.

In the above technical solutions, signals in the view 1 and the view 2 of two views in the algorithm design are split, and the signals are split for each view, respectively, that is, for the split of RGB signals. The sampling area is designed based on each color. Because each sub-pixel has a certain actual output position, the sampling area can be determined, and the correspondence of the corresponding input signals can be determined according to the sampling area.

What are described above is related to the illustrative embodiments of the disclosure only and not limitative to the scope of the disclosure; the scopes of the disclosure are defined by the accompanying claims.

The application claims priority to the Chinese patent application No. 201510543531.X, filed Aug. 28, 2015, the entire disclosure of which is incorporated herein by reference as part of the present application.

What is claimed is:

1. A pixel array, comprising multiple columns of sub-pixel groups, each column of sub-pixel groups comprises M×N sub-pixels arranged along a column direction, wherein M is a number of colors of the sub-pixels and N is a positive integer greater than 2,
sub-pixel groups in odd numbered columns are offset, in the column direction, from sub-pixel groups in even numbered columns by a determined distance, wherein the offset is a distance in the column direction, three adjacent sub-pixels in one column differ in color and each of the three adjacent sub-pixels is different in color from a corresponding sub-pixel in an adjacent column,
each sub-pixel in each column of sub-pixel groups distorts in the column direction, and a distortion direction of the sub-pixel groups in the odd numbered columns is opposite to a distortion direction of the sub-pixel groups in the even numbered columns,
wherein the determined distance is ½ of a width of each sub-pixel in the column direction, each of the sub-pixels has a shape of a parallelogram, and an inner acute angle of the parallelogram is between 0 and 20 degrees.

2. The pixel array according to claim 1, wherein the parallelogram comprises two first sides along the column direction and two second sides adjacent to the two first sides, wherein second sides of parallelograms in adjacent columns intersect with each other and have a same angle relative to the column direction.

3. The pixel array according to claim 1, wherein the inner acute angle of the parallelogram is between 5 and 8 degrees.

4. The pixel array according to claim 1, wherein each pixel unit comprises sub-pixels of a setting number in each column of the sub-pixel groups and the setting number is 1, 3/2 or 2.

5. The pixel array according to claim 1, wherein the M has a value of 3 and the pixel array is a triangular array.

6. The pixel array according to claim 1, wherein a width of each of the sub-pixels in the column direction is ½ of that in a row direction.

7. A display driving device, configured to drive a 3D display device, the 3D display device comprising the pixel array according to claim 1, the display driving device comprising:
- a first pixel division unit configured to divide an image to be displayed into a plurality of pixel units, and determine color components of each color in each pixel unit; and
- a first luminance determination unit configured to, for each sub-pixel, determine a luminance of the sub-pixel according to the color components of the color of the sub-pixel in each pixel unit covered by a sampling area corresponding to the sub-pixel.

8. The display driving device according to claim 7, wherein the sampling area is a rectangular area, and four end points of the rectangular area are on center lines, in the column direction, of two columns adjacent to a column where the sub-pixel is located and are each at a distance of 3/2 sub-pixel heights from a line passing the center of the sub-pixel along a row direction.

9. A display driving method, used to drive a 3D display device, the 3D display device comprising the pixel array according to claim 1, wherein the sub-pixels in the odd numbered columns are first view sub-pixel groups and sub-pixels in the even numbered columns are second view sub-pixel groups, the display driving method comprising:
- dividing the first and the second views to be displayed into a plurality of pixel units, and determining color components of each color in each pixel unit; and
- for each sub-pixel of each view, determining a luminance of the sub-pixel according to color components of the color of the sub-pixel in each pixel unit belonging to the view and covered by a sampling area corresponding to the sub-pixel.

10. The display driving method according to claim 9, wherein the sampling area is a rectangular area, and four end points of the rectangular area are on center lines, in the column direction, of two columns adjacent to a column where the sub-pixel is located and are each at a distance of 3/2 sub-pixel heights from a line passing the center of the sub-pixel along a row direction.

11. A display device, comprising the pixel array according to claim 1 or the display driving device according to claim 7.

12. The display device according to claim 11, wherein the parallelogram comprises two first sides along the column direction and two second sides adjacent to the two first sides, wherein second sides of parallelograms in adjacent columns intersect with each other and have a same angle relative to the column direction.

* * * * *